(12) United States Patent
Queitsch et al.

(10) Patent No.: US 11,722,583 B2
(45) Date of Patent: *Aug. 8, 2023

(54) SYSTEM AND METHOD FOR ASSET MANAGEMENT AND INTEGRATION

(71) Applicant: Arora Technology Group, LLC, Chadds Ford, PA (US)

(72) Inventors: Evan Queitsch, Newark, DE (US); Nitin Dinkar Patil, Maharashtra (IN); Manik Kumar Arora, West Chester, PA (US)

(73) Assignee: Arora Technology Group LLC, Chadds Ford, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/739,941

(22) Filed: May 9, 2022

(65) Prior Publication Data

US 2022/0263924 A1    Aug. 18, 2022

Related U.S. Application Data

(63) Continuation of application No. 17/144,765, filed on Jan. 8, 2021, now Pat. No. 11,356,535, which is a continuation of application No. 15/727,336, filed on Oct. 6, 2017, now Pat. No. 10,911,569.

(60) Provisional application No. 62/405,168, filed on Oct. 6, 2016.

(51) Int. Cl.
| | |
|---|---|
| *H04L 67/63* | (2022.01) |
| *H04L 9/40* | (2022.01) |
| *H04L 9/32* | (2006.01) |
| *H04L 1/00* | (2006.01) |

(52) U.S. Cl.
CPC ............ *H04L 67/63* (2022.05); *H04L 1/0078* (2013.01); *H04L 9/32* (2013.01); *H04L 63/123* (2013.01)

(58) Field of Classification Search
CPC ..... H04L 1/0078; H04L 9/32; H04L 63/0428; H04L 63/123; H04L 67/567; H04L 67/63
See application file for complete search history.

(56) References Cited

U.S. PATENT DOCUMENTS

| | | | | |
|---|---|---|---|---|
| 2005/0278706 A1* | 12/2005 | Garza | ................. | G06F 11/3636 717/131 |
| 2006/0277319 A1* | 12/2006 | Elien | ..................... | H04L 51/226 709/239 |
| 2007/0073804 A1* | 3/2007 | Allman | .................. | G06Q 40/04 709/203 |
| 2007/0168301 A1* | 7/2007 | Eisner | ................. | H04L 63/0209 705/79 |
| 2011/0276636 A1* | 11/2011 | Cheng | .................... | H04L 69/18 709/206 |

(Continued)

*Primary Examiner* — Gil H. Lee
(74) *Attorney, Agent, or Firm* — White and Williams LLP

(57) ABSTRACT

A system for communicating and managing messaging between a source system and a destination system including a publisher module, a topic module that receives the message from the publisher module and including one or more subscription modules, a queue module that receives the message from the topic module, a success queue module, an error queue module, and a subscriber module that receives the message from the queue module, then decompresses, decrypts, calculates the check sum, then prepares the message for transmission to the destination system and transmits the message to the destination system.

1 Claim, 4 Drawing Sheets

(56) References Cited

U.S. PATENT DOCUMENTS

2016/0098307 A1* 4/2016 Bora ................. G06F 16/25
                                                    719/313
2017/0180269 A1* 6/2017 Payne ................ H04L 47/00

* cited by examiner

Location Hierarchy     System Hierarchy

SYSTEM AND METHOD FOR ASSET MANAGEMENT AND INTEGRATION

CROSS-REFERENCE TO RELATED APPLICATION

This application is a continuation of U.S. patent application Ser. No. 17/144,765 filed Jan. 8, 2021, now U.S. patent Ser. No. 11/356,535, which is a continuation of U.S. patent application Ser. No. 15/727,336 filed Oct. 6, 2017, now U.S. Pat. No. 10,911,569, which claims the benefit of U.S. Provisional Application Ser. No. 62/405,168 filed Oct. 16, 2016, the contents of which are hereby incorporated by reference in their entirety.

BACKGROUND

In facilities maintenance and operations, the centerpiece of the focus of the operation and management of facilities is the asset. Some of the most complex problems with prior systems are that assets are part and parcel of a variety of systems, each system has its own identifier for each asset, and a single asset could be part of multiple systems. There are additional challenges associated with mapping assets to the systems to which they a part and mapping asset identifiers across multiple systems.

Another issue with prior systems relates to managing the communication and data flow between the components of an enterprise solutions and/or systems outside of solution. In these, traditional integration service design allowed for message to be dropped, lost or otherwise removed from the system without record. This created problems with data not arriving at the destination system and caused errors in process flows and data exchanges.

SUMMARY

A system for communicating and managing messaging between a source system and a destination system including a publisher module, a topic module that receives the message from the publisher module and including one or more subscription modules, a queue module that receives the message from the topic module, a success queue module, an error queue module, and a subscriber module that receives the message from the queue module, then decompresses, decrypts, calculates the check sum, then prepares the message for transmission to the destination system and transmits the message to the destination system.

BRIEF DESCRIPTION OF THE DRAWINGS

The various embodiments of the present invention now will be discussed in detail with an emphasis on highlighting the advantageous features. These embodiments depict the features shown in the accompanying drawings, which are for illustrative purposes only. These drawings include the following figures, in which like numerals indicate like parts.

DETAILED DESCRIPTION

Figure 1:
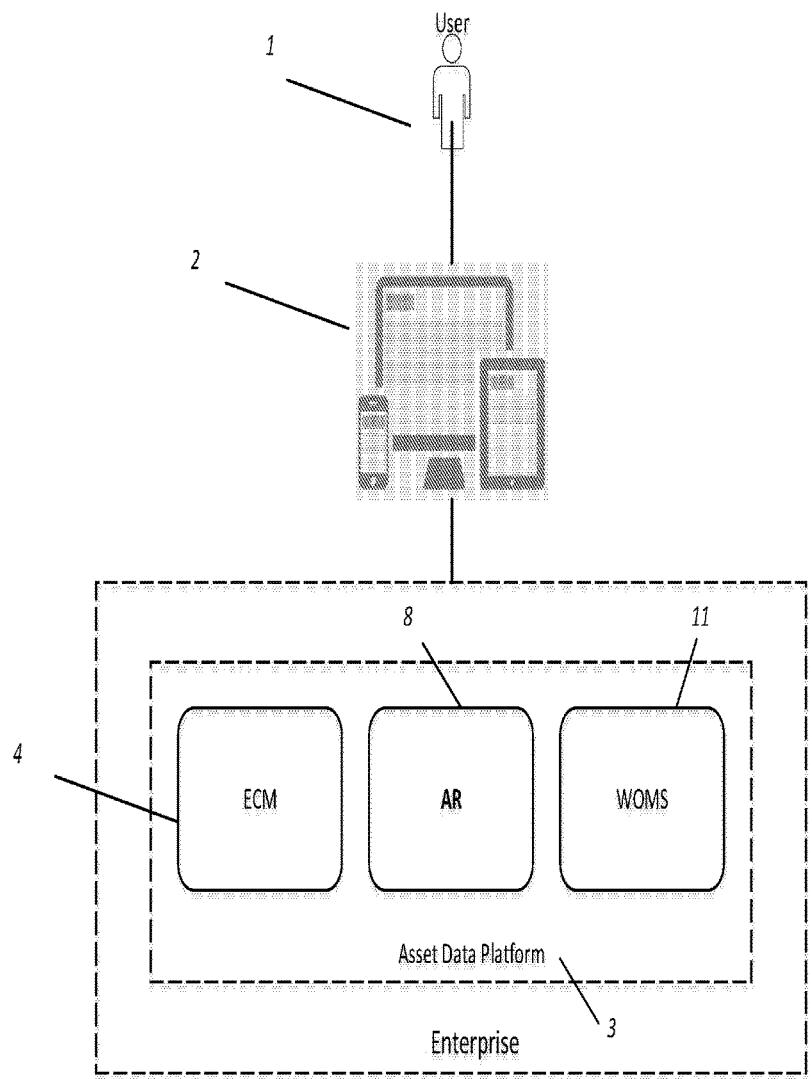
FIG. 1 shows a diagram of an asset identifying system according to an aspect of the present invention.

The following detailed description describes the present embodiments with reference to the drawings. In the drawings, reference numbers label elements of the present embodiments. These reference numbers are reproduced below in connection with the discussion of the corresponding drawing features.

The asset registry of the present invention allows assets to be part of more than one collection and to become the single source of truth for asset identifiers across the enterprise. The system of the present invention combines this capability of the asset registry with a shared asset hierarchy model and uses links to other systems to create an Asset Data Platform (ADP). The ADP may include the asset registry with a shared asset hierarchy, an enterprise content management system and a computerized maintenance management system. The CMMS (Computerized Maintenance Management System) may be responsible for managing maintenance workflows and tasks.

The ECM (Enterprise Content Management) of the present invention may organize documents, drawings, and models across the organization. Components may be tied together with the help of an Integration engine. The system of the present invention further includes auditing, fault tolerance, performance and flexibility by including a service bus that protects against lost data, ensure timely delivery of messages, creates a reliable audit trail and flexible for variety of systems running on diverse platforms.

The system of the present invention, as shown in FIG. 1, may include an Asset Data Platform (ADP) 3 that may provide enterprises with a modern, reliable, scalable, flexible, and secure end-to-end asset management solution. The approach of the system of the present invention is to tie relevant but all-too-often disconnected information to assets that are authoritatively defined in an Asset Registry (AR) 8. Their relationship to other assets, people, processes, lines of business, and locations are established based on a Shared Asset Hierarchy (SAH). In one aspect, it may allow different airport systems to exchange information in a consistent manner.

System Design

Figure 2:
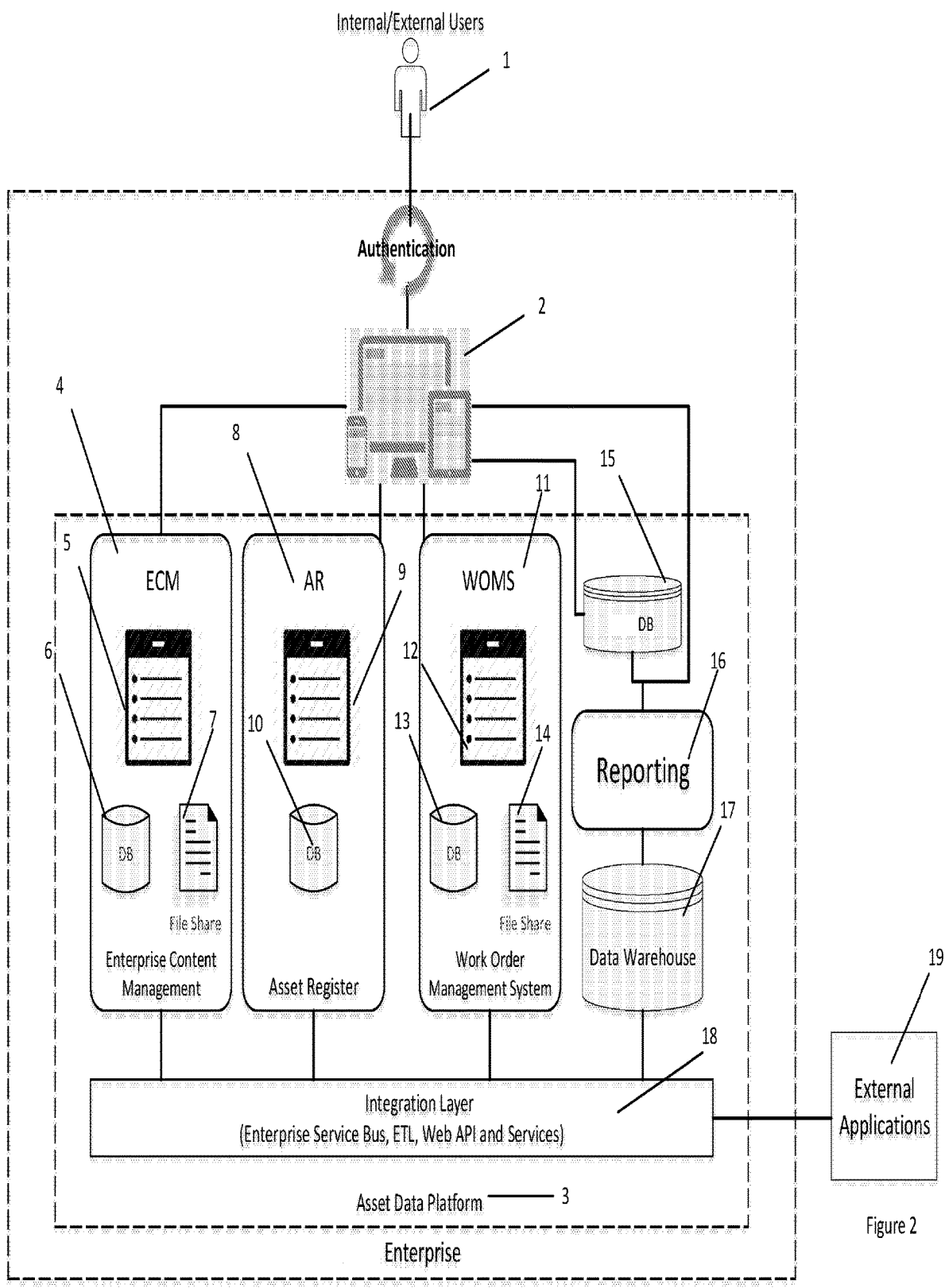
FIG. 2 shows a diagram of an asset identifying system according to an aspect of the present invention.
Figure 3:
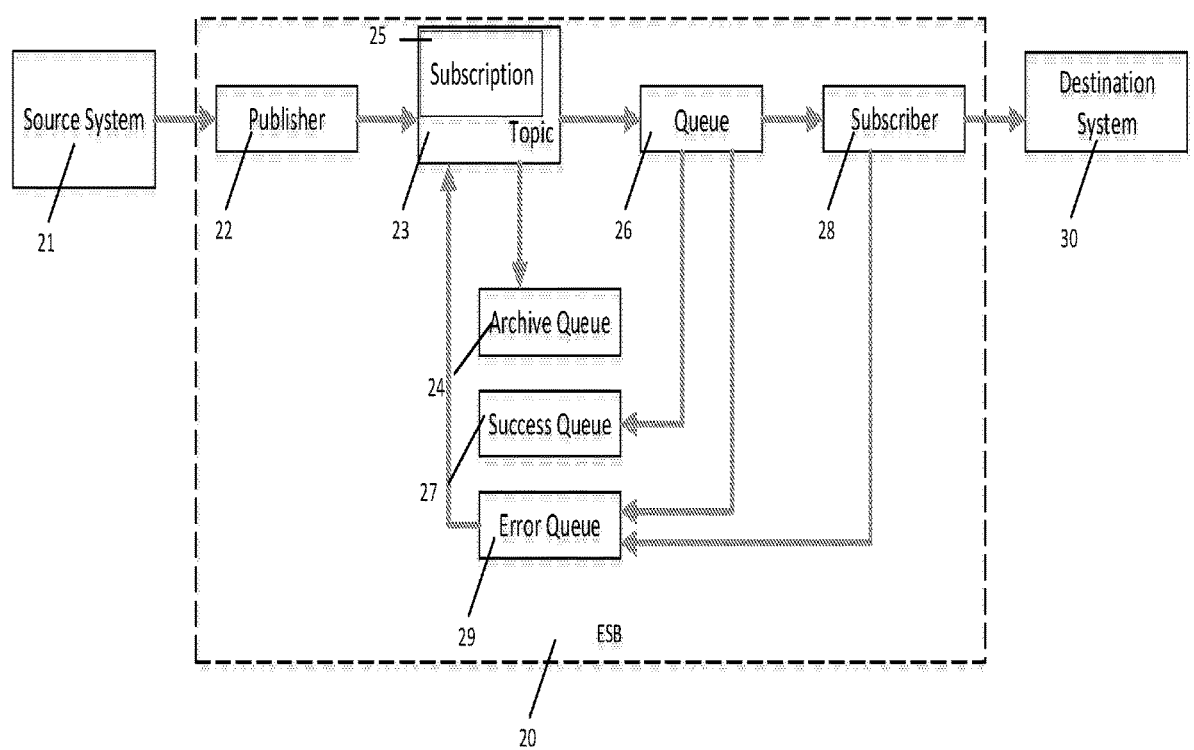
FIG. 3 shows a diagram of an enterprise service bus according to an aspect of the present invention.

The system of the present invention may be designed with an authoritative asset registry which serves as a single source of truth for the collection of asset information as well as the shared asset hierarchy. In the diagram shown in FIG. 2, the asset registry 1 may be shown to be made up of a database 10 and an application 9. Additional systems support the authoritative asset registry. The enterprise content management system 4 contains records of all the documents related to assets within the enterprise. The work order management system 11 manages maintenance work orders, maintenance history and other maintenance information related to maintainable assets.

The concept of the Asset Data Platform 3 is that every asset may be distinct and it has a location. Some assets may be fixed, either permanently or temporarily, on a certain point, some may be part of a line and others may be inside of a polygon. The asset registry 1 of the present invention stores asset information which may include: an asset identification number, asset identification numbers from other enterprise systems, serial number and asset description, in a database 10. The asset registry 1 of the present invention also stores location information which may include: X positioning coordinate; Y positioning coordinate and; Z positioning coordinate. By collecting identifiers from surrounding systems, the asset registry 8 can quickly and easily retrieve asset information from across all of those systems. This ensures that asset data is consistent throughout multiple systems by storing all asset identifiers and shared asset data in a single location.

One example of how the system of the present invention may be used may be related to the asset maintenance cycle. In this example, identification and location information for an asset has already been entered into the asset registry database 10 inside the asset registry system 8. Additionally, documents are stored in the enterprise content management file share 7, metadata about the documents and related assets may be stored within the ECM database 6, maintenance related metadata resides within the work order management system database 13 and maintenance work order copies reside within the work order management system file share 14. In this non-limiting example, a user 1 uses an authentication method to gain access via a personal computing device 2 to access a maintenance work order request for a broken rooftop air handling unit. The user may be authenticated by the database 15 which confirms access to the work order request.

The user 1 queries the asset registry database 10 via the asset registry application 9 for data about the air handling unit. The asset registry system 8 collaborates with the supporting systems such as internal systems: enterprise content management 4, work order management system 11, and external systems 19 to retrieve data about the air handling unit by passing messages through the integration layer 18. All system databases have unique identifiers for the asset. The asset registry system 8 compiles and stores the identifiers for each asset across the multiple system databases. The enterprise content management system 4 processes the message, searches its database 6 and returns the product manual as well as architectural drawings of the location of the asset which are stored within its file share 7. The work order management system 11 processes the message, searches its database 13 and returns a work order history along with an inspection checklist which may be stored within its file share 14. Additionally, the external financial system 19 may be queried and provides the asset purchase date along with the replacement cost of the air handling unit and its related components. Another query may be received by the data warehouse 17 which provides device analytics such as the last known system state and the previous 5-year operating history of the air handling unit and its subcomponents. This data may be presented via the reporting engine 16.

Asset Hierarchy

Assets are often part of collections of assets which the system of the present invention defines as an asset hierarchy. These hierarchies can be multi-dimensional and assets can fit into one or many collections as a part of their hierarchy. These collections can be functional collections such as the department which owns, houses, or maintains the asset; location collections such as the site, building, floor, or office where the asset resides or; system collections such as the parent and child assets that combine with the asset. The solution establishes a hierarchical data model that defines, relates, and records metadata about enterprise assets. The system of the present invention adjusts the shared asset hierarchy to address any specific corporate requirements not already covered by previous efforts and align it with the CMMS and ECM solutions, along with other platforms in use across the enterprise, such as a financial application.

Figure 4:
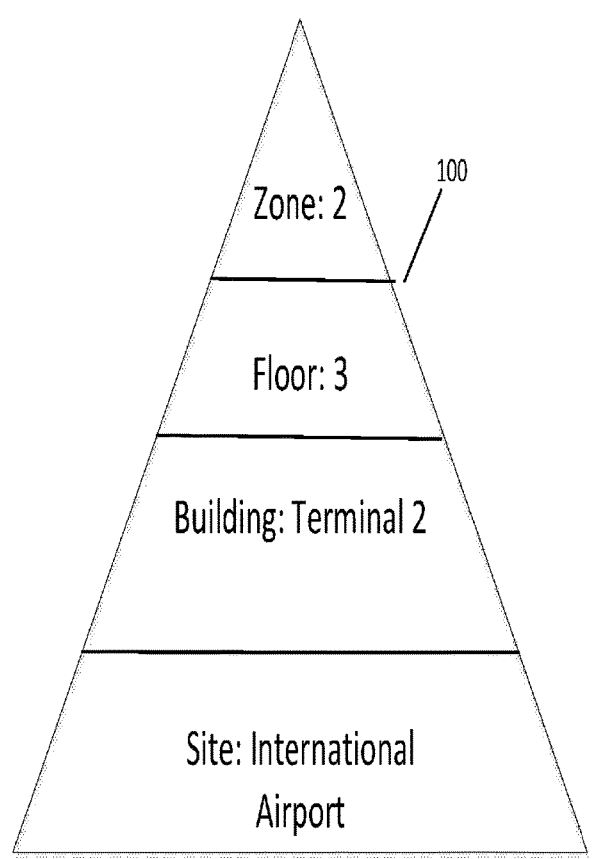
FIG. 4 shows diagrams of a location hierarchy and system hierarchy according to an aspect of the present invention.
Figure 4:
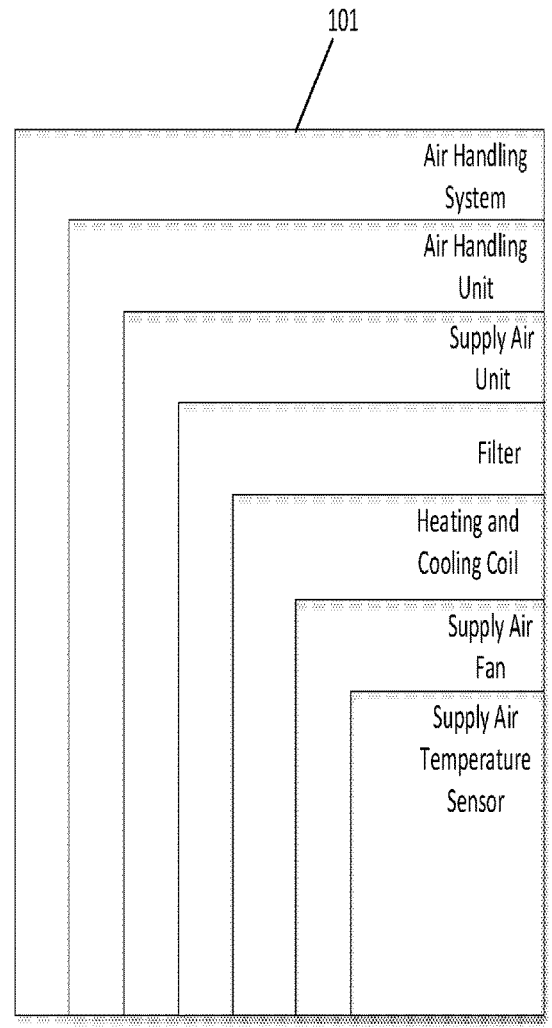

The resulting shared asset hierarchy may be implemented as a database to become the foundation of the asset registry. Its structure may be reflected in data standards and procedures. A data dictionary may also be provided to allow our information technology team members to efficiently implement and interface with the Asset Registry. This data dictionary ensures that the Asset Registry may be structured and implemented correctly. FIG. 4 provides examples of the Location Hierarchy 100 and the System Hierarchy 101 of a rooftop air handling unit.

The Asset Registry, with the appropriate identifiers, aliases, and foreign keys to other systems, becomes a hub for information exchange. The ADP interface also will allow new assets and types to be added after implementation by authorized users who follow a procedure designed to ensure long term data validity.

Asset Registry

The shared asset hierarchy that results from the activities described above may be implemented as a database to become the company's Authoritative Asset Registry. To accomplish this, the asset registry may contain our shared asset hierarchy and link assets to geolocations.

Database Design

This Database Design may provide the basis for the Asset Registry database design. It defines the database that will support the Asset Registry Data Model. It describes the logical and physical definition, non-functional issues, and the database interfaces; storage aspects are defined in the physical database design sections. The design may be created with expected data volumes, functional and non-functional usage of the tables, and performance considerations and requirements in mind.

The following topics are described below, Assumptions and decisions on database design; Entity-mapping; Table, column and view definitions; Primary, unique and foreign key definitions; Column and row level validation rules (check constraints); Rules for populating specific columns (sequences, derivations, denormalised columns, journaling); Interfaces and dependencies with other components; Data access description; and Scope, Approach and Methods.

The Database Design for the Asset registry may include of definitions for database objects derived by mapping entities to tables, attributes to columns, unique identifiers to unique keys and relationships to foreign keys. During design, these initial definitions are enhanced to support the functionality described in the functional specification/use cases and defined in the primary and supporting modules of the application High Level Design.

Entity Design

There may be a database which contains a number of tables. These tables may be: AR_ASSET; ASSET_TYPE; MAINTENANCE; LOCATION; PEOPLE; SUPPLIER; PRODUCT; COST_CENTER; PRESET_MASTER; PRESET_SUB; PRESETS; TICKET; TICKET_TRANSACTION; TICKET_PRIORITY; TICKET_SEVERITY; TICKET_STATUS; TICKET_TYPE; PIN_TYPES; PINS; REL_TICKET_CLOSURE_TEMPLATES; TICKET_TYPE_CLOSURE_TEMPLATES; USER_DEVICES; USER_DEVICE_LOCATION;

The AR_ASSET table may contain native columns such as: AssetId; AssetName; AssetDescription; SerialNumber; BarcodeNumber; RFIDTag; AlternateLocation; PurchaseDate; PurchaseCurrency; PurchaseCost; WarrentyEnd; CurrentCost; ReplaceCost; EstimatedDisposal; Cost; DisposalCurrency; Latitude; Longitude; Altitude; PoNumber; InvoiceNumber; CreatedDate; CreatedBy; ModifiedBy; ModifiedDate; IsActive; Level; parent_asset_id;

The AR_ASSET table may contain foreign key links to other tables such as: AssetTypeId (reference to ASSET_TYPE table); ProductId (reference to PRODUCT table); LocationId (reference to LOCATION table); PeopleId (reference to PEOPLE table); SupplierId (reference to SUPPLIER table); CostCenterId (reference to COST_CENTER table);

The ASSET_TYPE table may contain native columns such as: AssetTypeId; AssetTypeName; AssetDescription; ParentNodeId; CreatedDate; CreatedBy; ModifiedBy; ModifiedDate; IsActive;

The MAINTENANCE table may contain native columns such as: MaintenanceId; ParentlNodeId; MaintenanceCost; MaintenancePeriod; MaintenanceStartDate; MaintenanceEndDate; MaintenanceReferenceNumber; InstalledDate; MaintenanceServiceLevel; MaintenanceDescription; MaintenancePerformedBy; CreatedBy; CreatedDate; ModifiedBy; ModifiedDate; IsActive;

The MAINTENANCE table may contain foreign key links to other tables such as: AssetId (reference to AR_ASSET table);

The LOCATION table may contain native columns such as: LocationId; ParentNodeId; LocationName; LocationAddress; LocationCity; State; Country; Zipcode; EmailId; PhoneNumber; FaxNumber; Longitude; Latitude; Altitude; CreatedBy; CreatedDate; ModifiedBy; ModifiedDate; IsActive;

The PEOPLE table may contain native columns such as: PeopleId; Name; PhoneNumber; Address; Country; State; City; ZipCode; Designation; Department; MobileNumber; FaxNumber; Website; CreatedBy; CreatedDate; ModifiedBy; ModifiedDate; IsActive; Longitude; Altitude; Description; Latitude; ParentNodeId; EmailId;

The PEOPLE table may contain foreign key links to other tables such as: LocationId (reference to LOCATION table);

The SUPPLIER table may contain native columns such as: SupplierId; ParentNodeId; RFIDTag; ContactName; CompanyName; EmailId; PhoneNumber; Address; Country; State; City; ZipCode; MobileNumber; FaxNumber; Website; Latitude; Longitude; Altitude; Description; CreatedBy; CreadtedDate; ModifiedBy; ModifiedDate; IsActive;

The SUPPLIER table may contain foreign key links to other tables such as: LocationId (reference to LOCATION table);

The PRODUCT table may contain native columns such as: ProductId; ProductName; ProductDescription; BarcodeNumber; ParentNodeId; RFIDTag; SupplierPartNumber; ProductBrand; BuyPrice; SellPrice; Warranty; MeanTimeBetweenFailure; CreatedBy; CreatedDate; ModifiedBy; ModifiedDate; IsActive;

The PRODUCT table may contain foreign key links to other tables such as: SupplierId (reference to SUPPLIER table); AlterNativeSupplierId (reference to SUPPLIER table); AssetTypeId (reference to ASSET_TYPE table);

The COST_CENTER table may contain native columns such as: CostCenterId; CostCentreName; Description; PhoneNumber; Address; ParentNodeId; CreatedBy; CreatedDate; ModifiedBy; ModifiedDate; IsActive;

The COST_CENTER table may contain foreign key links to other tables such as: PeopleId (reference to PEOPLE table); LocationId (reference to LOCATION table);

The PRESET_MASTER table may contain native columns such as: PresetMasterId; PresetCode; PresetDescription; CreatedBy; CreatedDate; ModifiedBy; ModifiedDate; IsActive;

The PRESET_SUB table may contain native columns such as: PresetsSubId; Questions; DefaultText; CreatedBy; CreatedDate; ModifiedBy; ModifiedDate; IsActive;

The PRESET_SUB table may contain foreign key links to other tables such as: PresetMasterId (reference to PRESET_MASTER table);

The PRESETS table may contain native columns such as: PresetsId; PresetsAns; CreatedBy; CreatedDate; ModifiedBy; ModifiedDate; IsActive;

The PRESETS table may contain foreign key links to other tables such as: AssetId (reference to AR_ASSET table); PresetsSubId (reference to PRESET_SUB table);

The TICKET table may contain native columns such as: ticket_id; title; description; created_at; is_active; request_location; longitude; latitude; level; asset_name; submitter_email; submitter_contact_no;

The TICKET table may contain foreign key links to other tables such as: created_by (reference to USER table); ticket_type (reference to TICKET_TYPE table); pin_id (reference to PINS table); asset_id (reference to AR_ASSET table); submitter_id (reference to USER table);

The TICKET_TRANSACTION table may contain native columns such as: ticket_trans_id; updated_at; comments;

The TICKET_TRANSACTION table may contain foreign key links to other tables such as: ticket_id (reference to TICKET table); updated_by (reference to USER table); assinged_to (reference to USER table); priority_id (reference to TICKET_PRIORITY table); severity_id (reference to TICKET_SEVERITY table); status_id (reference to TICKET_STATUS table);

The TICKET_PRIORITY table may contain native columns such as: priority_id; priority_level;

The TICKET_SEVERITY table may contain native columns such as: severity_id; severity_level;

The TICKET_STATUS table may contain native columns such as: status_id; status;

The TICKET_TYPE table may contain native columns such as: ticket_type_id; service_request;

The PIN_TYPES table may contain native columns such as: pin_type_id; pin_type;

The PINS table may contain native columns such as: pin_id; pin_color;

The PINS table may contain foreign key links to other tables such as: pin_type_id (reference to PIN_TYPES table);

The REL_TICKET_CLOSURE_TEMPLATES table may contain native columns such as: rel_ticket_closure_temp_id; is_active; added_on; added_by; modified_by, modified_on;

The REL_TICKET_CLOSURE_TEMPLATES table may contain foreign key links to other tables such as: ticket_id (reference to TICKET table); ticket_type_closure_template_id (reference to TICKET_TYPE_CLOSURE_TEMPLATES table);

The TICKET_TYPE_CLOSURE_TEMPLATES table may contain native columns such as: ticket_type_closure_template_id; closure_template_title; closure_template_name; closure_template_type; Created_on; Created_by; Modified_by; Modified_on; Is_active;

The TICKET_TYPE_CLOSURE_TEMPLATES table may contain foreign key links to other tables such as: ticket_type_id (reference to TICKET_TYPE table);

The USER_DEVICES table may contain native columns such as: id; mac_address; is_active; added_on; added_by; modified_by, modified_on;

The USER_DEVICES table may contain foreign key links to other tables such as: user_id (reference to USER table);

The USER_DEVICE_LOCATION table may contain native columns such as: id; mac_address; longitude; latitude; level; is_active; added_on; added_by; modified_by, modified_on;

The USER_DEVICE_LOCATION table may contain foreign key links to other tables such as: user_id (reference to USER table).

Enterprise Service Bus (ESB)

The ESB of the present invention may provide access to external programs such as financial applications. In a typical case, using a financial application as one non-limiting example, a financial application would consume the Publisher Service, a common REST API, to broadcast messages for consumption by other programs. A financial application may be able to determine what data it wants to send and can publish only that data to the Publisher Service. These messages would be first encrypted, the key held by a financial application and distributed to only specific systems which are to have access to the data in these messages. Once the data is encrypted, the Publisher Service will publish the message to the ESB in the form of a common topic.

At this point, no data may be exposed as it may be encrypted within the message being held inside the topic. The Topic collects all types of messages from the Publisher Service. The Topic immediately creates a copy of the message to store in the Archive Queue as a record of the message and for later retrieval in the case of an error. The Topic then sends the message on to individual Queues which are created for each application on the ASB.

The Queue holds the messages received from the Topic and prepares them for the Function. Each Queue may be configured with a series of filters which the end application uses to determine what messages it will accept and what messages it will reject as well as thresholds for message retrieval limits. This ensures that the messages delivered to the Queue are relevant and desired by the end application. From here, the messages are delivered to the Function for processing. Upon successful delivery of a message to the Function, a copy of the message may be sent to the Audit Queue. Should the delivery of a message fail, a message may be sent to the Error Queue.

The Function will receive the message from the Queue. This function will have the actual data mappings between the message received and the end application. At this stage, the function will decrypt the message, unwrap it and begin an ETL process. The function will extract the data from the message, make the transformations as required by the mappings, and load it into the end application either directly or via application APIs.

A topic provides one-directional communication using subscriptions-a single topic can have multiple subscriptions. Like a queue, a topic acts as a broker, but each subscription can optionally use a filter to receive only messages that match specific criteria.

This document describes the high-level architecture for the Enterprise Service Bus. An enterprise service bus (ESB) 20 implements a communication system between mutually interacting software applications in a service-oriented architecture (SOA). It implements software architecture as depicted on the right. As it implements a distributed computing architecture, it implements a special variant of the more general client-server model, wherein, in general, any application using ESB 20 can behave as server or client in turns. ESB 20 promotes agility and flexibility with regard to high-level protocol communication between applications. The primary goal of the high-level protocol communication may be enterprise application integration (EAI) of heterogeneous and complex service or application landscapes.

Source applications may communicate in the same way with the ESB 20: the ESB translates a message to the correct message type and sends the message to the correct destination application. The following diagram shows the high level working of enterprise service bus.

ESB Overview

The ESB 20 provides the easy, flexible, secure, scalable, and highly efficient communications between enterprise systems.

The ESB 20 may include the Publisher Service 22, Topic 23, Subscriptions 25, Queues 26, 24, 27, 29, and Subscribers 28.

Publisher Service

The Publisher Service 22 works as middleware between source system 21 and Topic. The Publisher Service 22 may accept the request from source system 21, authenticate the request, validate the request, process the request, calculate check sum of the request, encrypt the request, compress the request, send the request to the topic and may provide an acknowledgment back to the source system 21.

Features of the Publisher Service 22 are as follows: can communicate via Restful JSON or XML format; provide security to the message by applying the encryption and compression; communicate with topic.

Topic

A topic 23 provides one-directional communication using subscriptions 25—a single topic 23 can have multiple subscriptions 25. A topic 23 acts as a broker, but each subscription 25 can optionally use a filter to receive only messages that match specific criteria. This would be an entry point to the Queue 26.

Features of the Topic 23 are as follows can have multiple subscriptions using pub/sub approach and can be useful for multiple applications.

Subscriptions

A subscription 25 can be created under a topic 23 which may contain one or more rules to pass message to appropriate queue 26. Once the message is received on the Topic 23 based on the rule provided in the Subscription 25, the message may be passed to the appropriate queue 26.

Features of the Subscription 25 may be include that a subscription may have multiple rules; may be used to pass message to multiple queues; and may communicate through multi-platform application.

Individual Queues

A queue 26 may allow one-directional communication. Each queue 26 acts as an intermediary (sometimes called a broker) that stores sent messages until a subscriber 28 receives them. A single recipient receives each message. Every destination system 30 may have an individual queue 26. This queue 26 may receive the messages from the Topic 23. Once the message gets delivered successfully on the subscriber 28, the message may be moved to the Success Queue 27. Queues 26 have a retry limit which helps to resend the message to the subscriber 28 in case of failure and after threshold point of retry limit, the message may be moved to the Error Queue 29.

Archive Queue

The Archive Queue 24 may hold a copy of received message until and unless deleted. Archive queue 24 can be used to resend the message in case of any failure while receiving the message to the subscriber 28 or destination system 30.

Success Queue

The Success Queue 27 may hold a copy of messages that are successfully received by the subscriber 28 until and unless deleted. This queue may be used to analyze the number of success messages processed.

Error Queue

The Error Queue 29 may hold a copy of messages which are not received by the destination system 30. While making a copy of the failure messages, the ESB 20 attaches custom properties to the message. These custom properties hold the metadata information about the failed messages. In the custom properties the ESB 20 may attach the exact error message and/or cause of the message failure. The ESB support team can use this error message in order to troubleshoot or fix the cause of the message failure. Without attaching these custom properties to the failed messages, the time to diagnose the root cause of the failure would be magnified.

Subscriber

The Subscriber 28 may act as a middleware between Queue 26 and Destination System 30. The Subscriber 28 receives a message from the Queue 26. The Subscriber 28 may be responsible for decompression of the message, decryption of the message and checking the data truncation using checksum calculation. It further transforms the message to send the final data to the destination application using SDK provided by Destination System 30 or WebAPI/Web Service exposed by Destination System 30 or any kind of exposed communication gateway by the Destination System 30.

Features of the Subscriber 28 include decompressing and decrypting the message and may contain the transformation logic between message and the database objects of the destination application.

The above description presents the best mode contemplated for carrying out the present embodiments, and of the manner and process of practicing them, in such full, clear, concise, and exact terms as to enable any person skilled in the art to which they pertain to practice these embodiments. The present embodiments are, however, susceptible to modifications and alternate constructions from those discussed above that are fully equivalent. Consequently, the present invention is not limited to the particular embodiments disclosed. On the contrary, the present invention covers all modifications and alternate constructions coming within the spirit and scope of the present disclosure. For example, the steps in the processes described herein need not be performed in the same order as they have been presented, and may be performed in any order(s). Further, steps that have been presented as being performed separately may in alternative embodiments be performed concurrently. Likewise, steps that have been presented as being performed concurrently may in alternative embodiments be performed separately.

What is claimed is:

1. A system for communicating and managing messaging between a source software system and a destination software system, the system comprising:

a publisher module that receives a message directly from the source software system through a first network connection via one or more API's and database connections, then authenticates, validates, calculates a check sum, encrypts, compresses the message, and transmits an acknowledgment to the source software system through the first network connection thereby establishing an enterprise service bus;

a topic module that receives the message from the publisher module through the enterprise service bus, the topic module comprising a plurality of subscription modules, wherein each subscription module receives messages of a predetermined message type based on one or more predetermined rules and independent of identity of the destination software system and is associated with one or more queue modules and assists in routing the message to a selected queue module through the enterprise service bus, and wherein the topic module sends the message to an archive queue module through the enterprise service bus;

the selected queue module that receives the message from the topic module through the enterprise service bus, the selected queue module is associated with the destination software system and routes messages to one or more of a success queue module, an error queue module, and a subscriber module through the enterprise service bus;

the success queue module that stores a copy of the message;

the error queue module that stores a copy of the message and metadata relating to a failed delivery of the message; and the subscriber module associated with the destination software system that receives the message directly from the queue module through the enterprise service bus, then decompresses, decrypts, calculates the check sum, then prepares the message for transmission to the destination software system by transforming the message using one of an SDK and a WebAPI/Web Service associated with the destination software system and transmits the message to the destination software system through one of the first network connection and a second network connection.

* * * * *